(12) United States Patent
Gannon (10) Patent No.: US 8,323,506 B2
(45) Date of Patent: Dec. 4, 2012

(54) FILTRATION OF HYDROCARBON CONTAINING LIQUID

(75) Inventor: William J Gannon, Northford, CT (US)

(73) Assignee: SPI Filtration LLC, Northford, CT (US)

( * ) Notice: Subject to any disclaimer, the term of this patent is extended or adjusted under 35 U.S.C. 154(b) by 0 days.

(21) Appl. No.: 13/424,334

(22) Filed: Mar. 19, 2012

(65) Prior Publication Data

US 2012/0211425 A1 Aug. 23, 2012

Related U.S. Application Data

(62) Division of application No. 10/284,516, filed on Oct. 30, 2002, now Pat. No. 8,137,564, which is a division of application No. 09/502,270, filed on Feb. 11, 2000, now Pat. No. 6,503,390.

(51) Int. Cl.
| | |
|---|---|
| B01D 37/00 | (2006.01) |
| B01D 35/027 | (2006.01) |
| B01D 24/02 | (2006.01) |
| B01D 24/48 | (2006.01) |
| B01D 35/147 | (2006.01) |

(52) U.S. Cl. ............... 210/693; 210/747.3; 210/790; 210/163; 210/170.01; 210/172.1; 210/266; 210/434; 210/416.5; 210/502.1; 210/283

(58) Field of Classification Search ............ None
See application file for complete search history.

(56) References Cited

U.S. PATENT DOCUMENTS

| | | | | |
|---|---|---|---|---|
| 3,844,122 A | * | 10/1974 | Bliss, Jr. ................ | 405/108 |
| 4,136,997 A | * | 1/1979 | Chapman ................ | 405/210 |
| 4,541,209 A | * | 9/1985 | Hoag ..................... | 52/20 |
| 4,709,120 A | * | 11/1987 | Pearson ................... | 174/16.1 |
| 5,391,295 A | * | 2/1995 | Wilcox et al. ............ | 210/165 |
| 5,679,246 A | * | 10/1997 | Wilcox et al. ............ | 210/165 |
| 6,304,444 B1 | * | 10/2001 | Combs et al. ............ | 361/695 |
| 6,485,639 B1 | * | 11/2002 | Gannon et al. ........... | 210/164 |
| 6,503,390 B1 | * | 1/2003 | Gannon ................. | 210/164 |
| 6,841,077 B2 | * | 1/2005 | Gannon et al. ........... | 210/692 |
| 7,014,755 B2 | * | 3/2006 | Muir et al. .............. | 210/164 |
| 7,527,738 B2 | * | 5/2009 | Gonzalez et al. ......... | 210/690 |
| 8,137,564 B2 | * | 3/2012 | Gannon ................. | 210/691 |
| 8,158,010 B2 | * | 4/2012 | Pearse et al. ............ | 210/747.1 |
| 2003/0047522 A1 | * | 3/2003 | Gannon et al. ........... | 210/799 |
| 2003/0047523 A1 | * | 3/2003 | Gannon ................. | 210/799 |
| 2005/0082230 A1 | * | 4/2005 | Gonzales et al. ......... | 210/690 |
| 2005/0230302 A1 | * | 10/2005 | Muir et al. .............. | 210/290 |
| 2011/0253641 A1 | * | 10/2011 | Pearse et al. ............ | 210/747.3 |
| 2012/0211425 A1 | * | 8/2012 | Gannon ................. | 210/660 |

* cited by examiner

*Primary Examiner* — Robert James Popovics
(74) *Attorney, Agent, or Firm* — The Miller Law Offices PLC; Steven J. Miller, Esq.

(57) ABSTRACT

An apparatus for and method of filtering hydrocarbon contaminated water, which may be used in drainage openings in parking lots and containment areas for large sources of hydrocarbons to remove hydrocarbons from hydrocarbon contaminated water. The apparatus has a filtration compartment which filters out debris which may clog the treatment compartment. A pre-filtration and means for melting snow may be incorporated. The treatment compartment contains a hydrocarbon absorption media which absorbs any hydrocarbons present in the water rendering such water substantially hydrocarbon-free for discharge directly into a stream or groundwater. If a hydrocarbon spill occurs, the hydrocarbon absorption media forms a plug which seals off the flow of contaminated water. A hydrocarbon solubilizing material capable of effectively removing sheen in a first pass may be disposed as a top layer over the hydrocarbon absorption media. Preferably, each compartment is manufactured as a cartridge capable of being inserted into a drain opening.

10 Claims, 7 Drawing Sheets

FILTRATION OF HYDROCARBON CONTAINING LIQUID

This application, U.S. patent application Ser. No. 13/424,334, filed on Mar, 19, 2012, is a divisional of U.S. patent application Ser. No. 10/284,516 which was filed on Oct. 30, 2002, now U.S. Pat. No. 8,137,564, which issued on Mar. 20, 2012, which is a divisional of U.S. patent application Ser. No. 09/502,270 which was filed on February 11, 2000, now U.S. Pat. No. 6,503,390, which issued on Jan. 7, 2003.

BACKGROUND OF THE INVENTION

1. Field of the Invention

This invention relates to an apparatus for and method of treating hydrocarbon contaminated water utilizing a hydrocarbon absorption media disclosed in U.S. patent application Ser. No. 09/227,654, now U.S. Pat. No. 6,485,639, which issued on Nov. 26, 2002, and is herein incorporated by reference. The apparatus and method of the present invention results in an almost maintenance-free way of substantially removing hydrocarbons from water having sheen found in parking lots, and a preferred embodiment is adapted to prevent and contain hydrocarbon spills in containment areas for electrical transformers or oil tanks.

2. Description of Related Art

Parking lots are coming under increasing scrutiny as sources of hydrocarbon contamination since automobile vehicles leaking fuel or oil mix with rain or storm water resulting in water having sheen which is discharged into streams and ground water. The difficulty is not just handling the hydrocarbons, but separating it efficiently and economically from a large quantity of water. Parking lots pose additional problems not found in other situations of hydrocarbon contamination. The large open spaces usually garner debris such as leaves, sticks and other fairly large objects in addition to sediment. Debris and sediment would clog any passive device used in filtering and removing the hydrocarbons and would likely create standing pools of water in the parking lot. Thus, it would be desirable to first filter out the debris and sediment prior to treating the hydrocarbon contaminated water such that the apparatus does not clog. Furthermore, given the potentially large amounts of debris and sediment found in a parking lot, it would also be desirable to have a device which allows easy access in removing the captured debris.

Another area of hydrocarbon contamination which has proven difficult in managing are containment areas for electrical transformers, oil tanks and other large sources of hydrocarbons. Usually, the problems are similar to those of parking lots, e.g., debris and sediment clogging any hydrocarbon filtration device. However, the danger occurs when there is a spill which may leak several thousand gallons of oil or other hydrocarbons into the environment and cause a fire hazard. Although the containment area may be sufficient to contain the spill, in the event of fire, many containment areas also have deluge systems which automatically start dousing the area with large amounts of water in an attempt to control or put out the fire. In these situations, a passive device to remove minor hydrocarbon contamination is no longer useful; agents used to absorb hydrocarbons which solidify upon absorption would clog any means of discharge and with the deluge system continuously pumping more water into the containment area, the containment area is no longer able to contain such a large volume of water. Thus, it would be desirable to provide a containment area which provides both passive means of filtration and removal of hydrocarbons and which, in the event of a fire, would provide a bypass system to control the volume of liquid within the containment area.

Bearing in mind the problems and deficiencies of the prior art, it is therefore an object of the present invention to provide an apparatus for and method of passive treatment of hydrocarbon contaminated water wherein the hydrocarbon contaminated water is rendered substantially hydrocarbon-free for discharge into a stream or ground water.

It is another object of the present invention to provide an apparatus for and method of substantially containing a hydrocarbon spill in a containment area for electrical transformers, oil tanks or other sources of hydrocarbons to prevent discharge of hydrocarbons into the environment while maintaining a bypass system in the event of an overload of hydrocarbon contaminated water.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, an apparatus for treating hydrocarbon contaminated water comprising: a housing; a filtration compartment within the housing having a means for filtering out sediment and debris; and a treatment compartment located below the filtration compartment within the housing containing a hydrocarbon absorption media adapted to absorb hydrocarbons such that hydrocarbon contaminated water flowing from the filtration compartment into the treatment compartment is rendered substantially hydrocarbon-free.

The means for filtering out sediment and debris may comprise at least one porous tube extending from a top surface of the housing into the filtration compartment; or a non-porous tube extending from a top surface of the housing into the filtration compartment having one or more openings located adjacent the top surface of the housing, and further including a porous tube disposed within the non-porous tube extending from the top surface of the housing; or a plurality of porous tubes extending from a bottom surface of the filtration compartment, the plurality of porous tubes having a closed end adjacent a top portion of the housing adapted to permit flow of hydrocarbon contaminated water into the filtration compartment to trap sediment and debris prior to entering the treatment compartment for absorption of hydrocarbons.

Preferably, the hydrocarbon absorption media comprises: a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent. The hydrocarbon absorption media may further include a hydrocarbon solubilizing media disposed thereover.

Preferably, the filtration compartment is a cartridge disposed within the housing above the treatment compartment.

The current aspect of this invention may further include an outer housing wherein the housing and the compartments are disposed within the outer housing. A gasket may be included to provide a liquid-tight seal around the housing when the housing and compartments are placed in the outer housing. The outer housing embodiment may further include a means for preventing back wash of any liquid into the treatment compartment while allowing hydrocarbon-free water to flow from the treatment compartment; and a gasket adapted to provide a liquid-tight seal around the housing when the apparatus is placed in a drain. Preferably, a means for melting snow and ice may also be incorporated within the filtration compartment such that snow and ice does not hinder the flow of liquid during extreme weather conditions. A pre-filter may be removably attached to a top surface of the housing.

Preferably, the treatment compartment is a cartridge disposed within the housing containing a hydrocarbon absorption media for absorbing hydrocarbons comprising: a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent. Preferably, a porous layer is disposed over the hydrocarbon absorption media. A bed of hydrocarbon solubilizing media may be disposed over the hydrocarbon absorption media in the cartridge.

In a second aspect, the present invention is directed to an apparatus for treating hydrocarbon contaminated water comprising: a housing; a filtration compartment within the housing for filtering out sediment and debris; at least one porous tube within the filtration compartment; a treatment compartment located below the filtration compartment within the housing containing a hydrocarbon absorption media adapted to absorb hydrocarbons from the hydrocarbon contaminated water rendering any water flowing from the treatment compartment substantially hydrocarbon-free.

Preferably, the at least one porous tube has a closed end adjacent a top portion of the housing such that hydrocarbon contaminated water entering from the top portion of the housing into the filtration compartment may be directed into the treatment compartment by passing through porous walls of the at least one porous tube such that any debris or sediment is filtered by the at least one porous tube. Alternatively, the at least one porous tube has a closed end adjacent the treatment compartment such that hydrocarbon contaminated water entering from a top portion of the housing is directed into the treatment compartment by passing through interior walls of the at least one porous tube such that any debris may be captured within the at least one porous tube. Preferably, filter floss is tucked into the at least one porous tube to further aid in filtering sediment and debris from hydrocarbon contaminated water entering the treatment compartment. The current aspect may further include an outer housing and a gasket adapted to provide a liquid-tight seal around the outer housing when the apparatus is placed in a drain. The housing and the compartments may be disposed within the outer housing wherein a gasket surrounding the housing may be used to provide a liquid-tight seal around the housing. A means for melting snow and ice may be incorporated into the filtration compartment such that the flow of liquid is not hindered during extreme weather conditions. A pre-filter may be removably attached to a top surface of the housing.

In a third aspect, the present invention is directed to an apparatus for treating hydrocarbon contaminated water comprising: an outer housing; an inner housing disposed within the outer housing; a filtration compartment within the inner housing for filtering out sediment and debris comprising a non-porous tube extending from a top inner surface of the inner housing into the filtration compartment having at least one opening adjacent a top portion of the filtration compartment, and a porous tube disposed within the non-porous tube, the non-porous tube having a length greater than the porous tube; and a treatment compartment located below the filtration compartment within the inner housing containing a hydrocarbon absorption media adapted to absorb hydrocarbons from the hydrocarbon contaminated water rendering any water flowing from the treatment compartment substantially hydrocarbon-free.

Filter floss may be inserted into the porous tube to further aid in filtering debris and sediment. A gasket adapted to provide a liquid-tight seal around the outer housing when the apparatus is placed in a drain may also be included. A pre-filter may be removably attached to a top surface of the housing.

In a fourth aspect, the present invention is directed to an apparatus for treating hydrocarbon contaminated water comprising: a housing; a filtration compartment within the housing; a plurality of porous tubes extending from a bottom surface of the filtration compartment, the plurality of porous tubes having a closed end; a treatment compartment located below the filtration compartment within the housing containing a hydrocarbon absorption media adapted to absorb hydrocarbons from the hydrocarbon contaminated water rendering any water flowing from the treatment compartment substantially hydrocarbon-free; and a gasket adapted to provide a liquid-tight seal around the housing.

Preferably, the plurality of porous tubes are adapted to substantially trap sediment and debris in the hydrocarbon contaminated water while permitting flow of the water into the treatment compartment. A means for melting snow and ice may be incorporated within the filtration compartment such that liquid flow is not hindered during extreme weather conditions.

In a fifth aspect, the present invention is directed to an apparatus for treating hydrocarbon contaminated water while capable of containing a hydrocarbon spill comprising: a housing adapted to be inserted into a drainage opening; a gasket disposed around the housing to provide a liquid-tight seal between the housing and the drainage opening; a filtration compartment disposed within the housing; a treatment compartment disposed within the housing beneath the filtration compartment containing a hydrocarbon absorption media adapted to absorb hydrocarbons from the hydrocarbon contaminated water rendering any water flowing from the treatment compartment substantially hydrocarbon-free; and a drainage pipe extending through the housing, the filtration compartment and the treatment compartment having a valve located at a first end of the drainage pipe. Preferably, the valve located at a first end of the drainage pipe is remotely operated. The current aspect may include a means for melting snow and ice within the filtration compartment such that liquid flow is not hindered during extreme weather conditions.

In a sixth aspect, the present invention is directed to a containment system for hydrocarbon spills comprising: a walled containment area; a drain opening within the walled containment area; a hydrocarbon filtration system set within the drain opening comprising a housing adapted to be inserted into the drain opening, a gasket disposed around the housing to provide a liquid-tight seal between the housing and the drain opening, a filtration compartment disposed within the housing, a treatment compartment disposed within the housing beneath the filtration compartment containing a hydrocarbon absorption media adapted to absorb hydrocarbons from the hydrocarbon contaminated water rendering any water flowing from the treatment compartment substantially hydrocarbon-free and adapted to form a plug when overloaded with hydrocarbons; and a drainage system adapted to evacuate the walled containment area comprising a drainage pipe having a valve at one end, the pipe extending through the hydrocarbon filtration system, a holding tank located at an other end of the drainage pipe, and a pump for evacuating the walled containment area of an excessive amount of hydrocarbon spill.

The drainage system of the containment system may further include an expandable, temporary holding tank connected to the holding tank such that an excessive amount of hydrocarbon spill may be pumped from the holding tank to the expandable, temporary holding tank. Preferably, the valve of the drainage system is remotely operated outside of the walled containment area.

In a seventh aspect, the present invention is directed to a method of filtering hydrocarbon contaminated water in an area having a drain opening comprising the steps of: providing a filtration device for inserting into the drain opening comprising a housing, a filtration compartment within the housing comprising at least one porous tube extending from a top inner surface of the housing into the filtration compartment, and a treatment compartment located below the filtration compartment within the housing containing a hydrocarbon absorption media adapted to absorb hydrocarbons comprising a material selected from the group consisting of styrene, pentadiene, cyclopentadiene, butylene, ethylene, isoprene, butadiene, propylene and mixtures thereof, and a filtration enabler; contacting the hydrocarbon contaminated water to the filtration device; filtering debris from the hydrocarbon contaminated water when the hydrocarbon contaminated water passes through the filtering compartment of the filtration device; and removing hydrocarbons in the hydrocarbon contaminated water when the hydrocarbon contaminated water passes through the treatment compartment of the filtration device such that hydrocarbon contaminated water flowing from the treatment compartment is rendered substantially hydrocarbon-free.

Preferably, the step of providing a filtration device comprises providing a filtration device further including a pre-filter. During the step of removing hydrocarbons in the hydrocarbon contaminated water, an excessive amount of hydrocarbons causes the hydrocarbon absorption media in the treatment compartment to form a plug sealing off and containing the hydrocarbon contaminated water.

In an eighth aspect, the present invention is directed to a method of filtering hydrocarbon contaminated water in an area having a drain opening comprising the steps of: providing a filtration device for insertion into the drain opening comprising a housing, a filtration compartment within the housing comprising a non-porous tube extending from a top surface of the housing into the filtration compartment having one or more openings located adjacent the top surface of the housing, and further including a porous tube disposed within the non-porous tube extending from the top surface of the housing, and a treatment compartment located below the filtration compartment within the housing containing a hydrocarbon absorption media adapted to absorb hydrocarbons comprising a material selected from the group consisting of styrene, pentadiene, cyclopentadiene, butylene, ethylene, isoprene, butadiene, propylene and mixtures thereof, and a filtration enabler; contacting the hydrocarbon contaminated water to the filtration device; filtering debris from the hydrocarbon contaminated water when the hydrocarbon contaminated water passes through the filtering compartment of the filtration device; and removing hydrocarbons in the hydrocarbon contaminated water when the hydrocarbon contaminated water passes through the treatment compartment of the filtration device such that hydrocarbon contaminated water flowing from the treatment compartment is rendered substantially hydrocarbon-free.

In a ninth aspect, the present invention is directed to a method of filtering hydrocarbon contaminated water in an area having a drain opening comprising the steps of: providing a filtration device for inserting into the drain opening comprising a housing, a filtration compartment within the housing comprising a plurality of porous tubes extending from a bottom surface of the filtration compartment, the plurality of porous tubes having a closed end adjacent a top portion of the housing adapted to permit flow of hydrocarbon contaminated water into the filtration compartment to trap sediment and debris prior to entering the treatment compartment for absorption of hydrocarbons, and a treatment compartment located below the filtration compartment within the housing containing a hydrocarbon absorption media adapted to absorb hydrocarbons comprising a material selected from the group consisting of styrene, pentadiene, cyclopentadiene, butylene, ethylene, isoprene, butadiene, propylene and mixtures thereof, and a filtration enabler; contacting the hydrocarbon contaminated water to the filtration device; filtering debris from the hydrocarbon contaminated water when the hydrocarbon contaminated water passes through the filtering compartment of the filtration device; and removing hydrocarbons in the hydrocarbon contaminated water when the hydrocarbon contaminated water passes through the treatment compartment of the filtration device such that hydrocarbon contaminated water flowing from the treatment compartment is rendered substantially hydrocarbon-free.

In a tenth aspect, the present invention is directed to a method of containing a hydrocarbon spill comprising the steps of providing a walled containment area having a drainage opening surrounding a hydrocarbon source; inserting a hydrocarbon treatment device in the drainage opening comprising a housing adapted to be inserted into the drain opening, a gasket disposed around the housing to provide a liquid-tight seal between the housing and the drain opening, a filtration compartment disposed within the housing having a means for filtering out sediment and debris, a treatment compartment disposed within the housing beneath the filtration compartment containing a hydrocarbon absorption media adapted to absorb hydrocarbons from the hydrocarbon contaminated water rendering any water flowing from the treatment compartment substantially hydrocarbon-free, and a drainage system adapted to evacuate the walled containment area having a drainage pipe with a valve at one end, the pipe extending through the hydrocarbon treatment device, a holding tank located at an other end of the drainage pipe, and a pump for evacuating the walled containment area of an excess hydrocarbon spill via the drainage pipe; draining any liquid within the walled containment area through the hydrocarbon treatment device such that liquid flowing from the treatment compartment is rendered substantially hydrocarbon-free; and opening the valve of the drainage system when excess hydrocarbon contaminated water is present; pumping excess hydrocarbon contaminated water from the walled containment area prior to the excess hydrocarbon contaminated water over-flowing from the walled containment area.

In an eleventh, and final aspect, the present invention is directed to a method of removing sediment from hydrocarbon contaminated water using a pre-filter; filtering debris and sediment from hydrocarbon contaminated water to produce a filtered hydrocarbon contaminated water; treating the filtered hydrocarbon contaminated water with a hydrocarbon absorption media comprising a polymeric blend and a filtration enabler; and removing substantially all hydrocarbons present in the filtered hydrocarbon contaminated water such that clarified water may be released into a surrounding environment.

BRIEF DESCRIPTION OF THE DRAWINGS

The features of the invention believed to be novel and the elements characteristic of the invention are set forth with particularity in the appended claims. The figures are for illustration purposes only and are not drawn to scale the invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-5 of the drawings in which like numerals refer to like features of the invention. Features of the invention are not necessarily shown to scale in the drawings.

The present invention provides an apparatus and method of treating hydrocarbon contaminated water, particularly in parking lots and electrical transformer containment areas, to contain spills of hydrocarbons such as oil and/or gasoline. The apparatus of the present invention is adapted to be placed in a drain with a gasket to provide a liquid-tight seal such that all liquid, e.g., hydrocarbon contaminated liquid, rainwater, stormwater, or other water having sheen, is forced to enter the housing of the apparatus and thus treated by first, passing through a filtration compartment and then a treatment compartment located within the housing. The filtration compartment filters out debris which may clog the treatment compartment. The treatment compartment contains a hydrocarbon absorption media disclosed in U.S. patent application Ser. No. 09/227,654, herein incorporated by reference, which absorbs any hydrocarbons present in the water rendering such water substantially hydrocarbon-free for discharge directly into the groundwater. For ease of use and maintenance, each compartment may be manufactured as a cartridge to be dropped into the housing.

Figure 1:
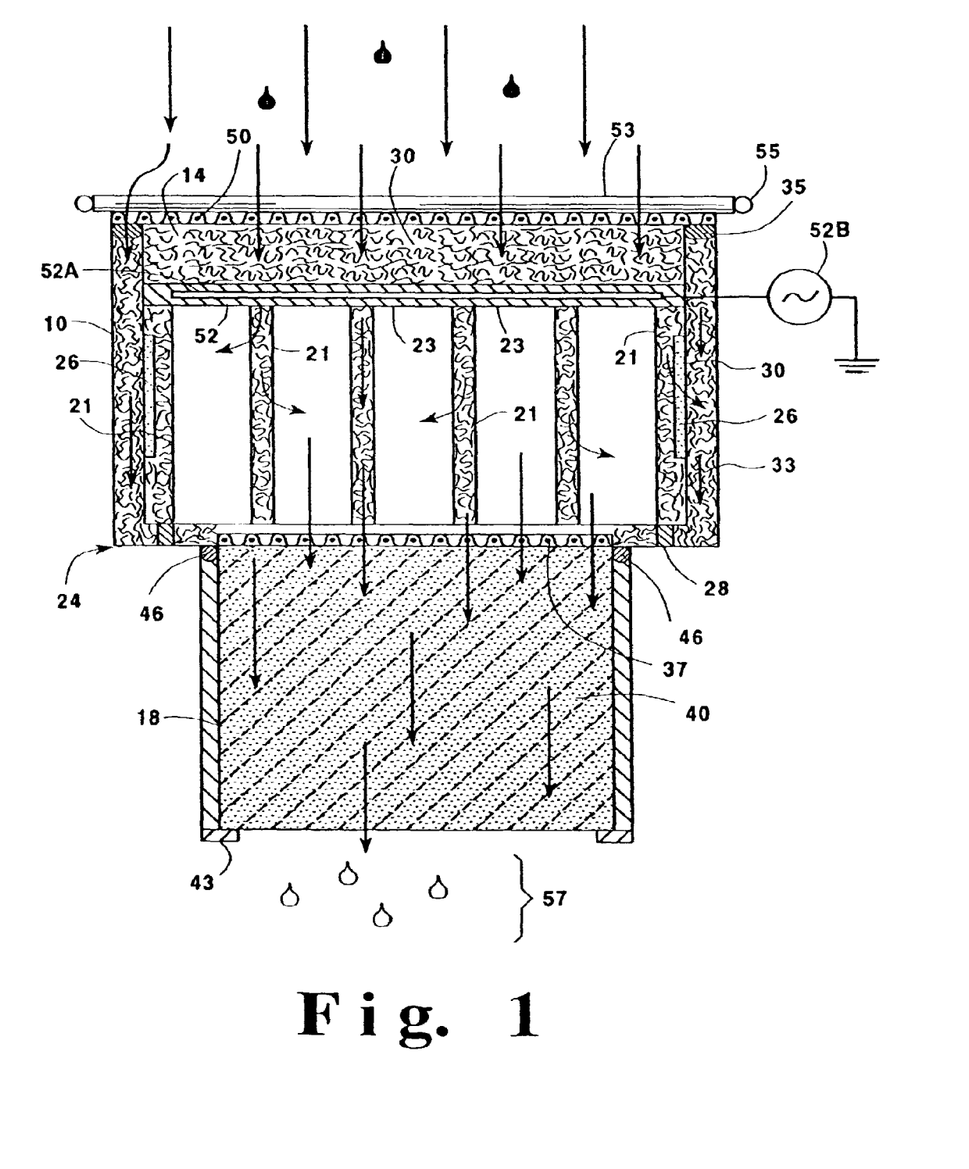
FIG. 1 is a cross-sectional view of a preferred embodiment of an apparatus of the present invention for use in drainage ditches which filters debris and sediment prior to removing hydrocarbons from hydrocarbon contaminated water.
Figure 1A:
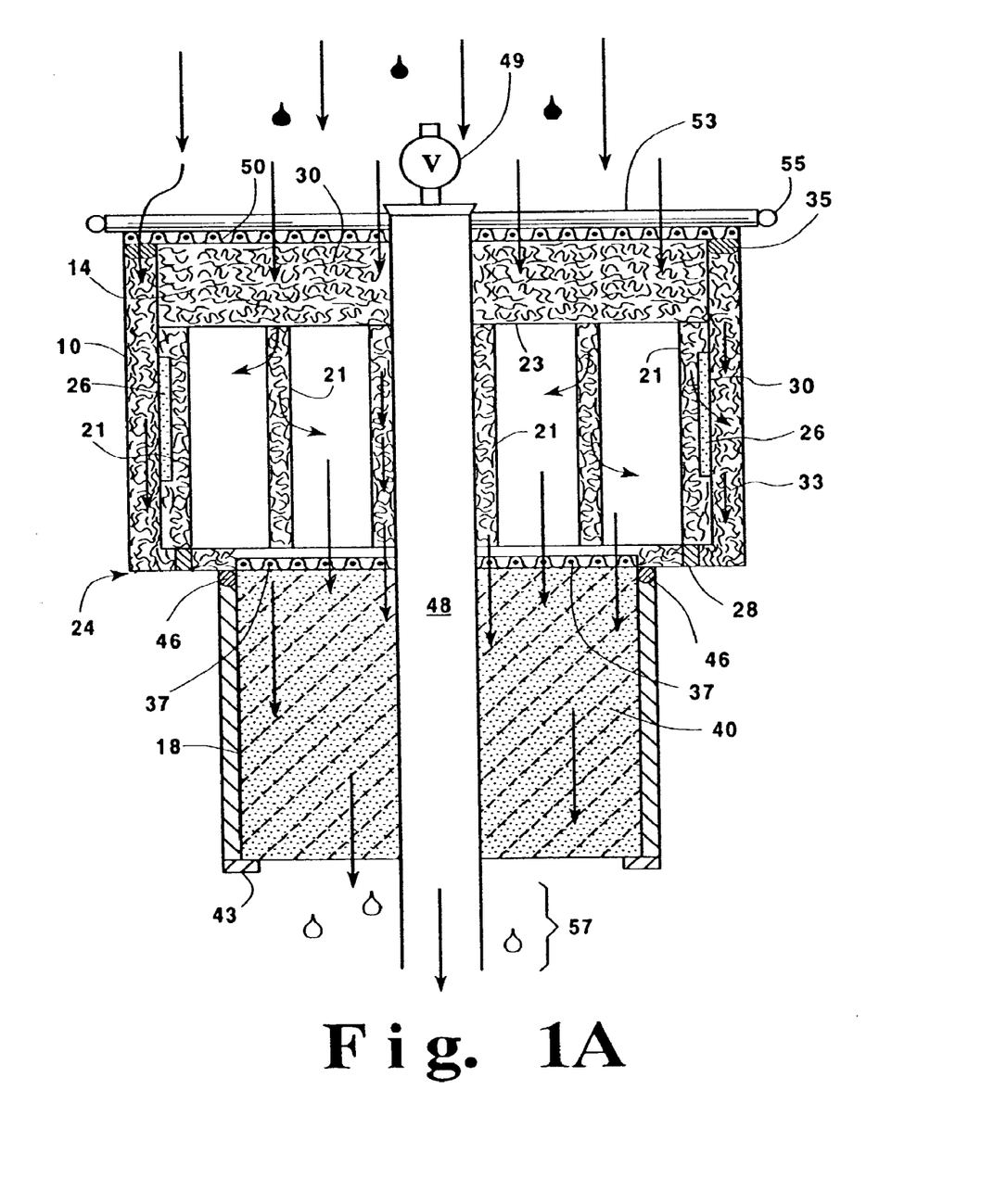
FIG. 1A is a cross-sectional view of another preferred embodiment of an apparatus of the present invention with a bypass system preferably used in containment areas which filters debris and sediment prior to removing hydrocarbons from hydrocarbon contaminated water.

In FIG. 1 is disclosed an embodiment of the present invention which is preferably used in a square, rectangular or circular drainage opening typically found in parking lots or within a containment area for electrical transformers. A housing 10 containing a filtration compartment 14 and a treatment compartment 18 may be inserted into a drainage opening (not shown) to treat any hydrocarbon contaminated water prior to the water draining into the ground water or sewer discharge while providing an easy flow through. Filtration compartment 14 preferably houses one or more porous pipes 21 extending from a bottom inner surface of filtration compartment 14. Porous pipes 21 preferably have a porosity of about 40 .mu.m to about 250 .mu.m to provide continuous flow of any liquid while filtering out substantially all debris and sediment. In this embodiment, porous pipes 21 have a closed end 23 such that any debris or sediment in the flow of water entering the top of housing 10 into filtration compartment 14 is not trapped inside the porous pipes which may hinder the flow of water into treatment compartment 18. Large debris is filtered out by the grate-like cover 53 usually covering drainage openings and also preferably by the mesh 50 covering housing 10. Sediment is also further removed and captured from treatment compartment 18 by filter floss 30 placed within the filtration compartment 14 around porous pipes 21.

Filtration compartment 14 sits above treatment compartment 18 by sitting on rests 28 which are located intermittently along elbow 24. A gasket 35 may provide a liquid-tight seal around filtration compartment 14 within housing 10 to ensure that all liquid is directed into filtration compartment 14 and subsequently treated. The space between the inner walls of housing 10 and the outer walls of filtration compartment 14 are also filled with filter floss 30 to allow water to flow down the space between the housing and the filtration compartment while filtering out sediment prior to entering treatment compartment 18. Porous discs 26 may be located in the vertical walls of filtration compartment 14 to further enhance the flow of water into treatment compartment 18. Filtration compartment 14 is key to providing a means for filtering out debris and sediment which has a tendency to clog treatment compartment 18 which when clogged accumulates water in the parking lot or containment area.

During extremely cold weather, water may freeze inside filtration compartment 14 hindering the flow of liquid into and through the treatment apparatus. Preferably, a means for melting snow and ice is incorporated inside filtration compartment 14. Such means may be a coiled heating wrap such as a pipe heating cable available from The Wrap-On Company, Inc. of Bedford Park, Ill., could be positioned inside filtration compartment 14 to provide a low level heating element to melt snow and ice within and outside the filtration compartment. The pipe heating cables may be attached to pieces of filtration mesh. The filtration mesh would lay flat within filtration compartment 14 having corresponding apertures for porous pipes 23. Preferably, a first filter mesh having the heating cables would sit in the bottom of filtration compartment 14. Filter floss is then tucked around porous pipes 23 to about half way up the pipes. A second mesh having the heating cables and corresponding apertures would be placed on top of the filter floss bed. Again filter floss is used to fill filtration compartment 14 and a third mesh having the heating cables is placed between the floss and mesh 50. The heating cables may exit from the treatment apparatus through a small aperture in filtration compartment 14 and housing 10 which preferably has a plug attachment connected to an electrical source. An electrical cable from an electrical source may be buried in a trench which leads to the drainage opening to be connected to the heating cables. In FIG. 1, a representative mesh 52 having a heating cable 52A is disposed within filtration compartment 14 on top of porous pipes 23. Heating cable 52A is schematically linked to an electrical source 52B.

Treatment compartment 18 contains a hydrocarbon absorption media disclosed in U.S. patent application Ser. No. 09/227,654, herein incorporated by reference. The hydrocarbon absorption media, comprises a polymeric absorbent comprising a material selected from the group consisting of styrene, pentadiene, cyclopentadiene, butylene, ethylene, isoprene, butadiene, propylene and mixtures thereof, and a filtration enabler intimately mixed with the polymeric absorbent. In the event of a spill or excessive hydrocarbon contact, the hydrocarbon absorption media forms a plug to prevent discharge of any hydrocarbons into the waste water stream. A hydrocarbon solubilizing media specifically engineered to remove sheen from hydrocarbons in a single pass such as MYCELX™ from Mother Environmental Systems, Inc. of Gainesville, Ga. may be used in conjunction with the hydrocarbon absorption media in treatment compartment 18. Preferably, about 1 inch to about 3 inches of the hydrocarbon solubilizing media may be placed as a top layer within treatment compartment 18 which will substantially remove low levels of hydrocarbons without overworking the polymeric absorbent.

Hydrocarbon contaminated water enters treatment compartment 18 which preferably has a mesh 37 disposed thereover so that divots are not created on the surface of the absorption media as the water contacts the absorption media. Treatment compartment 18 is preferably manufactured as a cartridge which may be simply dropped into service within housing 10. Thus, mesh 37 may be a top cover for the compartment. A gasket or similar seal 46 surrounds treatment compartment 18 to provide a liquid-tight seal forcing all water, particularly hydrocarbon contaminated water, to enter treatment compartment 18 and not to flow down the sides of housing 10 untreated. Treatment compartment 18 is held within housing 10 by resting on housing lip 43.

As hydrocarbon contaminated water, represented by the black droplets enters housing 10, it is directed into filtration compartment 14 for removal of debris and sediment, prior to entering treatment compartment 18. The direction of water flow is represented by the arrows. Large debris such as leaves and garbage are generally hindered by the grate-like cover 53 and mesh 50. Furthermore, an inflatable seal 55 which surrounds housing 10 provides a substantially liquid-tight seal around housing 10 thereby directing any water into housing 10 for treatment of hydrocarbon contamination. Upon entering treatment compartment 18, the hydrocarbon absorption media removes substantially all hydrocarbons from the contaminated water and, clarified water, represented by clear droplets 57, leaves treatment compartment 18 safe for ground water or release into streams.

In instances wherein the current embodiment is used in a containment area for an electrical transformer or other oil storage vessels, there is a concern that the hydrocarbon absorption media in treatment compartment 18 would plug up to contain a spill as it is suppose to do while a deluge system would pump water into the containment area. However, another embodiment, shown in FIG. 1A incorporates a bypass system into the filtration compartment and treatment compartment with a drainage mechanism. Within housing 10, filtration compartment 14, and treatment compartment 18, is incorporated a pipe 48 with a valve 49. Pipe 48 may be inserted into housing 10 by manufacturing the compartments as sections. By manufacturing the compartments as sections, the user is still able to easily remove and replace the compartments for ease of maintenance. Additionally, a means for providing a liquid-tight seal would also be provided around pipe 48. Valve 49 is preferably remotely operated so that during a hydrocarbon spill within the containment area which causes a fire and a deluge system is activated, the valve may be opened and closed without entering the containment area. Valves of this type are known in the art.

Figure 2:
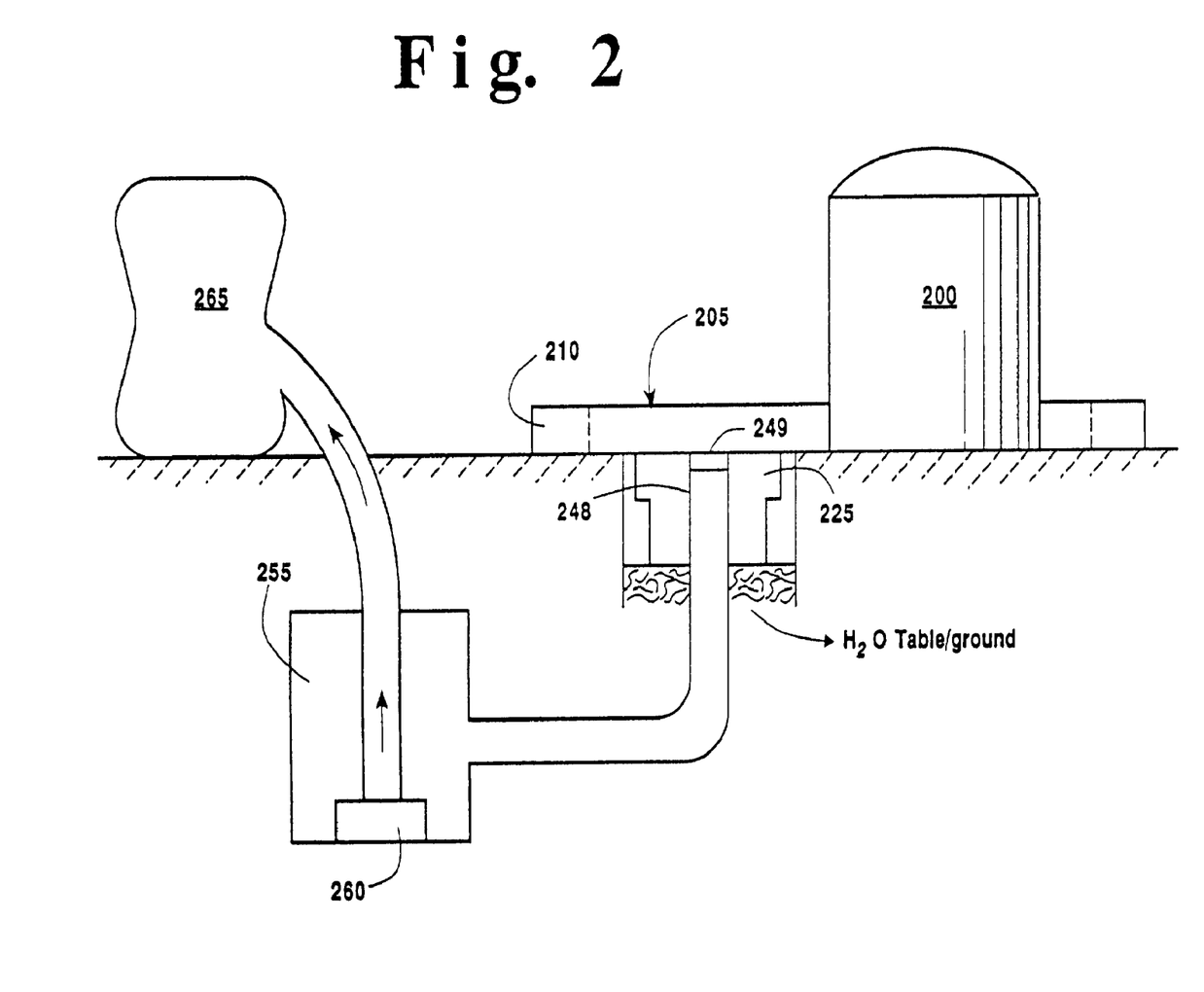
FIG. 2 is a schematic representation of the preferred embodiment of FIG. 1A as it is used in a containment area for large sources of hydrocarbons.

Illustrated in FIG. 2, is a containment system of the present invention for use with electrical transformers, oil tanks or other sources of hydrocarbons that may cause an environmental or safety concern in the event of a spill or leak. Hydrocarbon source 200 is situated within a containment area 205 having containment walls 210. Within containment area 205, in the drainage system, is an apparatus of the present invention described above. The hydrocarbon treatment apparatus 225 comprises the embodiment shown in FIG. 1A. Pipe 248 having valve 249 is situated within hydrocarbon treatment apparatus 225. When removing sheen or treating minor hydrocarbon contamination, the hydrocarbon treatment apparatus 225 removes the hydrocarbons and clarified water is released into the ground water. Pipe 248 is connected, using known means, to a holding tank 255 that may be located below ground. Holding tank 255 contains a pump 260 which may pump any overflow from holding tank 255 into an expandable baffle tank 265 or other temporary holding vessel. During a spill, hydrocarbon treatment apparatus 225 will plug up the flow of oil. However, in the event of a fire wherein deluge systems are automatically spraying volumes of water into the containment area, the flow of oil and water is prohibited from contaminating the waste water stream yet may overflow outside containment area 205. Valve 249 is safely remotely operated to discharge the excess water and oil from within containment area 205 prior to the excess water and oil flowing over containment walls 210. Any excess water/oil is held in holding tank 255 or if exceeding the capacity of holding tank 255, may be pumped into temporary, expandable baffle tank 265. Once the situation is under control, the valve may be closed such that remaining water within containment area 205 is treated for hydrocarbon contamination.

Figure 3:
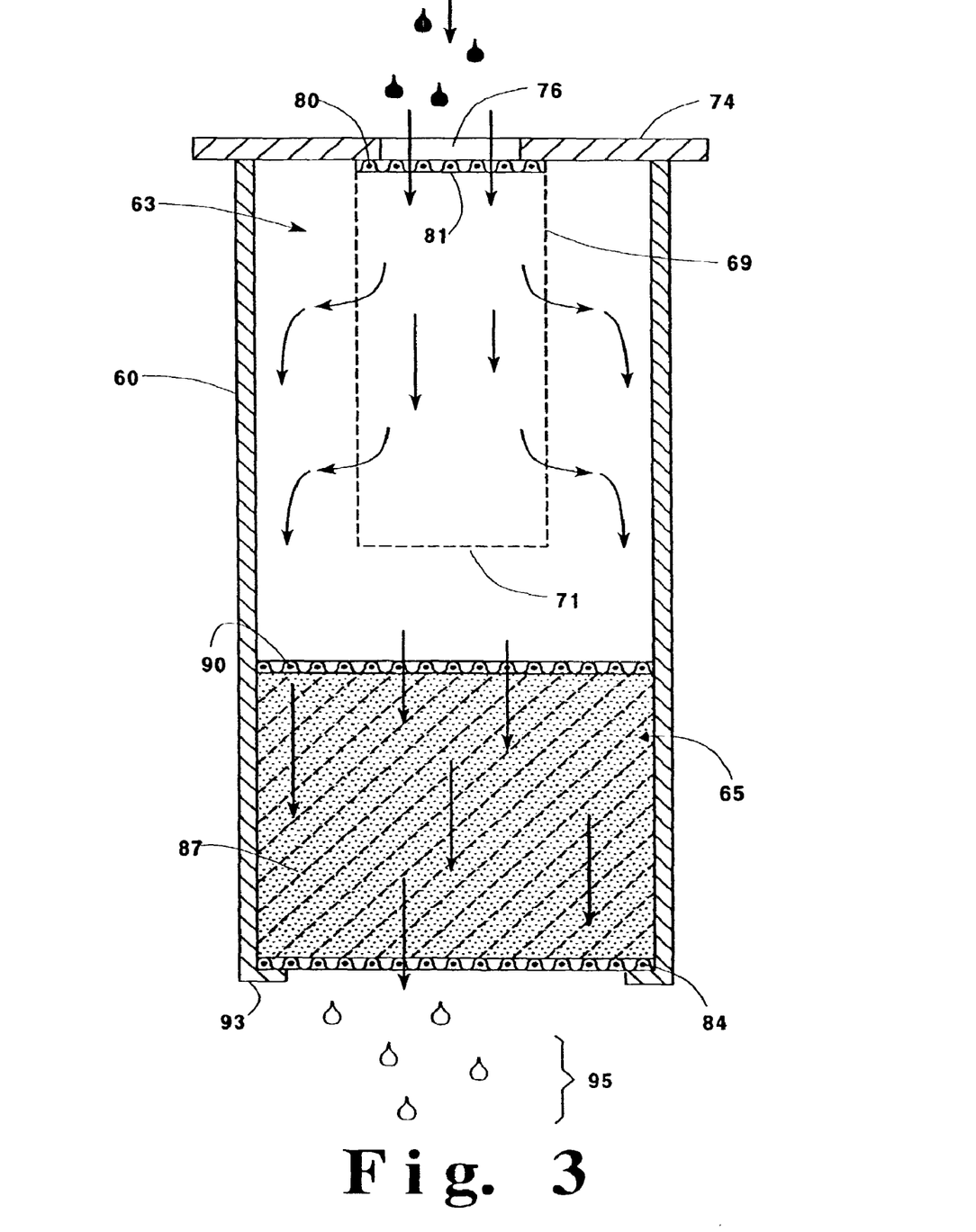
FIG. 3 is a cross-sectional view of yet another preferred embodiment of the present invention for use in circular drains wherein the porous pipe 69 has a closed end 71.

In another preferred embodiment shown in FIG. 3, the present invention may be used in drains located in areas such as garages or service stations. A housing 60 encompasses a first interior portion, filtration compartment 63, and a second interior portion, treatment compartment 65. Housing 60 is preferably made from polyvinylchloride (PVC), polyethylene or metal piping having a width of about 2 to about 12 inches to fit into a standard drain. Housing cover 74 has a center aperture 76 through which the hydrocarbon contaminated water flows into the device. Filtration compartment 63 comprises a porous pipe 69 having a first end 71 and a second end 81. Wherein first end 71 is closed, hydrocarbon contaminated water enters housing 60 through aperture 76 and flows out the sidewalls of porous pipe 69 in the direction of the arrows as shown. It is preferable that porous pipe 69 has a porosity of about 40 .mu.m to about 250 .mu.m such that debris and sediment is kept out of treatment compartment 65 while providing a steady, continuous flow of water. Furthermore, filter floss may also be inserted within porous pipe 69 to provide additional filtration.

Figure 3A:
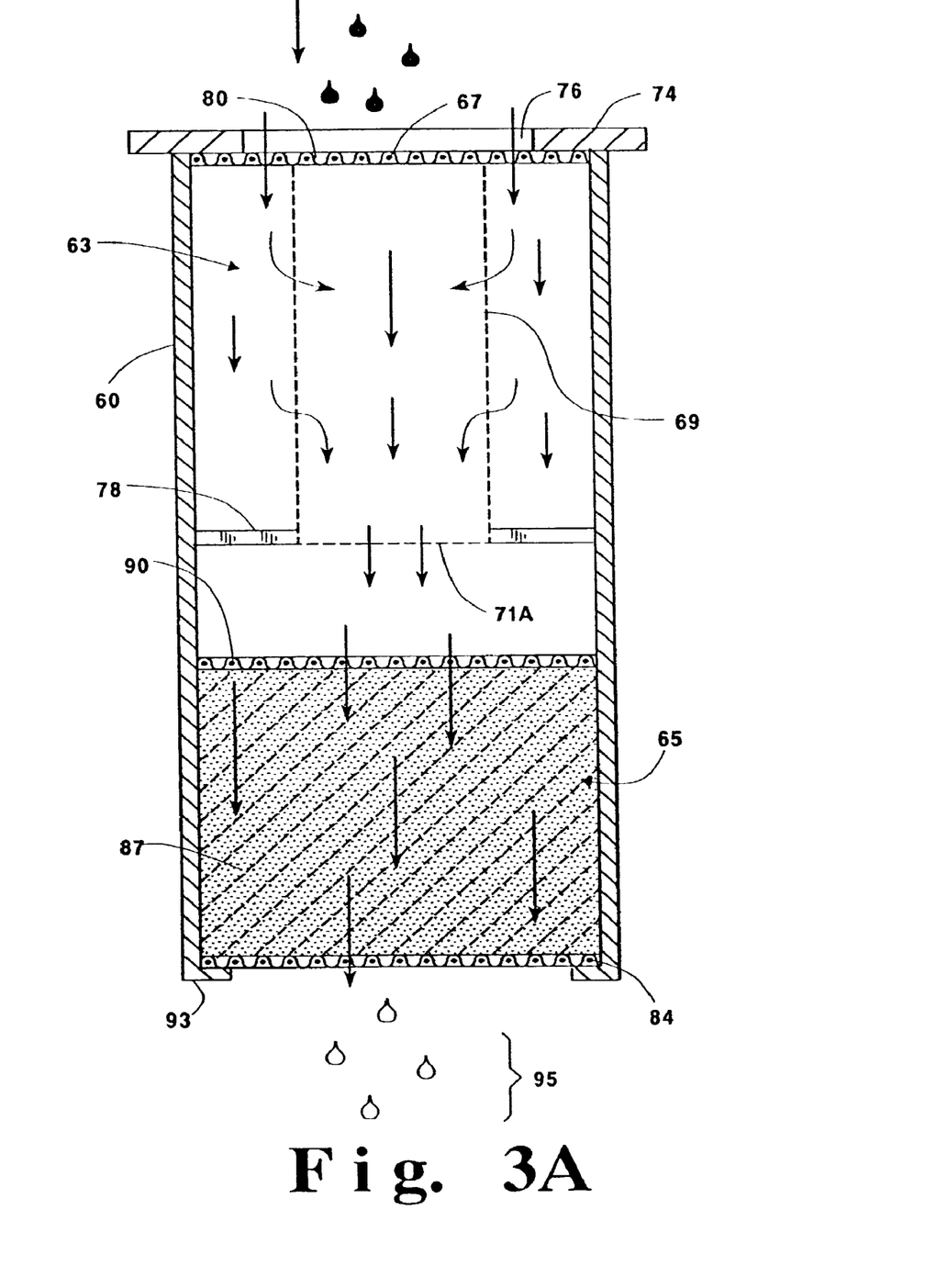
FIG. 3A is a cross-sectional view of an alternative embodiment of FIG. 3 wherein the porous pipe 69 has a closed end 80.

An alternative embodiment of porous pipe 69 may be a closed second end 80 with an open first end 71 as illustrated in FIG. 3A. In such an embodiment, hydrocarbon contaminated water enters housing 63 through aperture 76 to flow down the area between an inner wall of housing 63 and the outer sidewalls of porous pipe 69. Preferably, a mesh 67 under housing cover 74 would prevent large debris from entering and potentially clogging the filtration compartment 63. A lateral support 78 around porous pipe 69 extending to the inner walls of housing 60 stabilizes porous pipe 69 within the device. This configuration of porous pipe 69 allows hydrocarbon contaminated water to flow into treatment compartment 65 from outside porous pipe 69 to inside porous pipe 69 as illustrated by the arrows. Porous pipe 69 is of a porosity that debris and sediment is kept out of the inside of the pipe so that sediment does not clog up treatment compartment 65.

Treatment compartment 65 comprises a hydrocarbon absorption media 87 disclosed in U.S. patent application Ser. No. 09/227,654 which removes the hydrocarbons rendering the clarified water 95 substantially hydrocarbon-free. The absorption media sits on a porous layer or mesh 84 which rests on an inner lip 93 of housing 60. The absorption media is packed into the housing and capped off with another mesh 90. For ease of use, treatment compartment 65 may be manufactured as a cartridge which sits inside housing 60.

Figure 4:
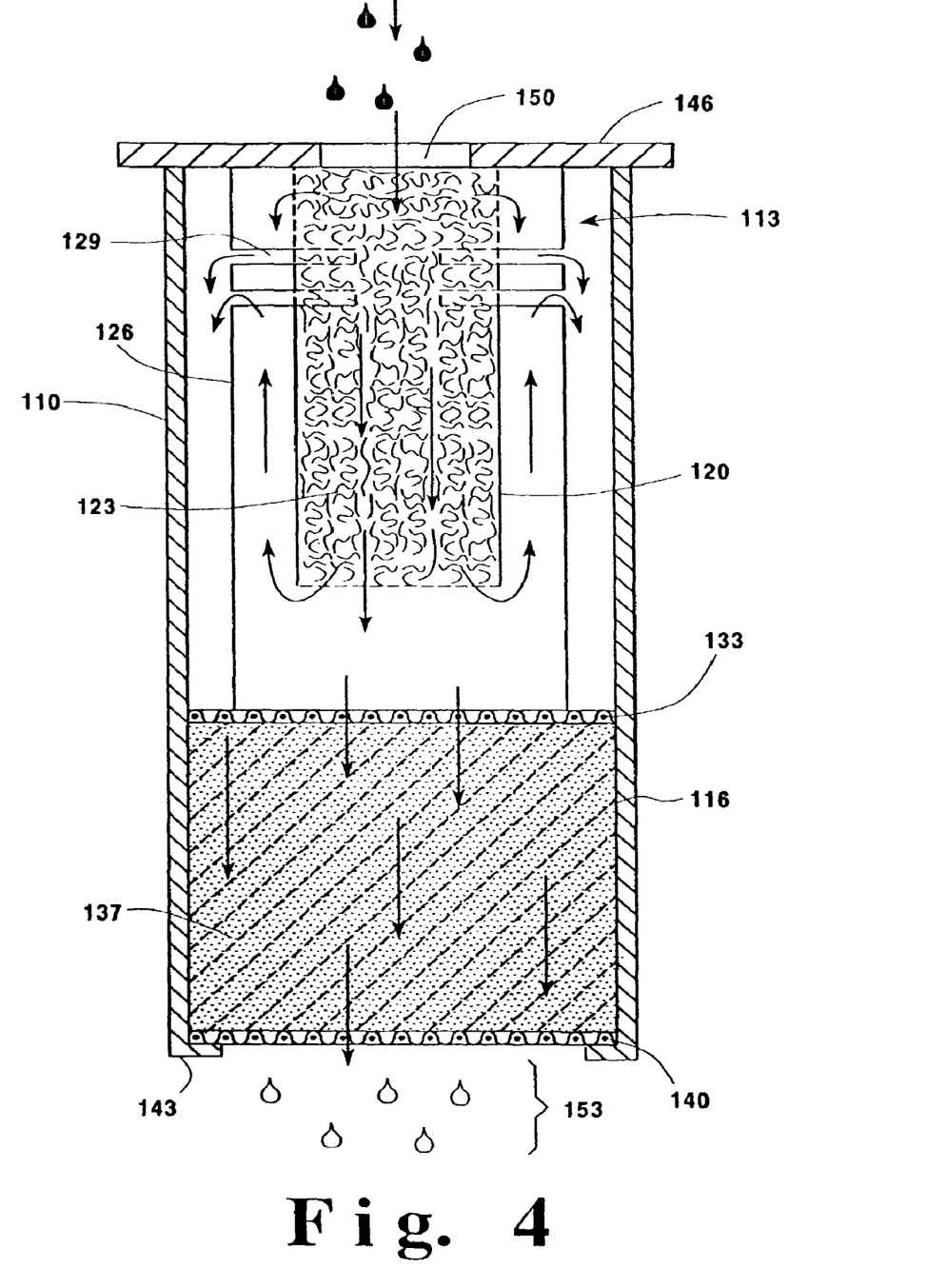
FIG. 4 is a cross-sectional view of the embodiment shown in FIG. 3 as it is used in a drain opening with an outer housing 59.

FIG. 4 illustrates yet another embodiment of an apparatus for filtering hydrocarbon contaminated water for use in a drain. Housing 110 comprises a housing cover 146, a first interior portion, filtration compartment 113, and a second interior portion, treatment compartment 116. The filtration compartment 113 comprises an inner porous pipe 120 and an outer solid pipe 126. Hydrocarbon contaminated water enters housing 110 through aperture 150 in housing cover 146. Filter floss 123 is preferably present to capture debris and sediment from entering treatment compartment 116. However, given the porosity of porous pipe 120, water may still flow out through the porous walls of pipe 120. The addition of outer pipe 126 provides an additional means for the easy flow of water. Debris which passes through porous pipe 120 and settles on top of treatment compartment 116 may cause the water to buildup until it reaches openings 129 of outer pipe 126. The water then continues to flow down the space between outer pipe 126 and the inner surface of housing 110 to reach treatment compartment 116 for removal of hydrocarbons.

Treatment compartment 116 comprises a hydrocarbon absorption media 137 which removes the hydrocarbons rendering the clarified water 153 substantially hydrocarbon-free. The absorption media sits on a porous layer or mesh 140 which rests on an inner lip 143 of housing 110. The absorption media is packed into the housing and capped off with a mesh 133. For ease of use, treatment compartment 116 may be manufactured as a cartridge which sits inside housing 110.

Figure 5:
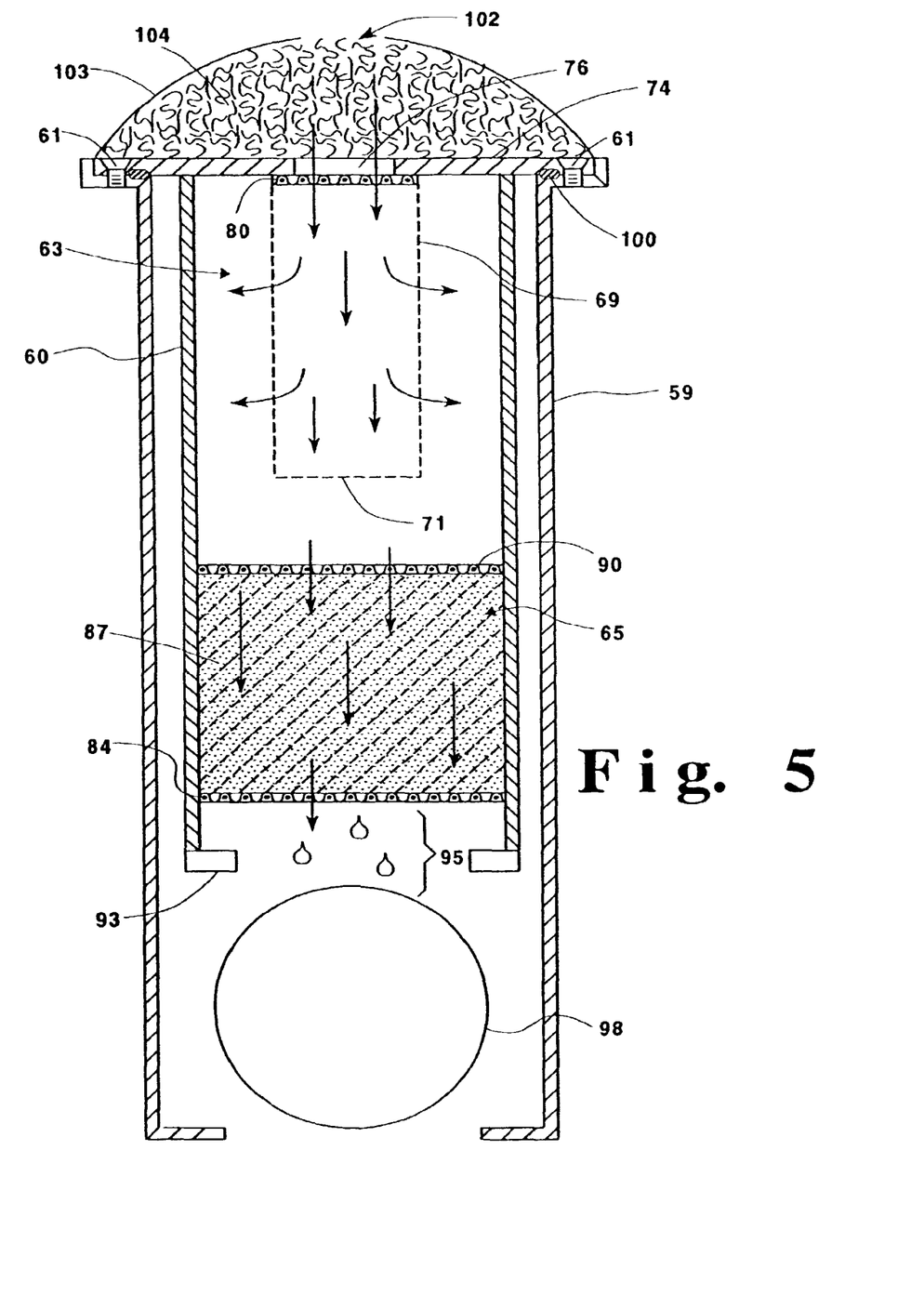
FIG. 5 is a cross-sectional view of still yet another preferred embodiment of the present invention for use in circular drains.

The embodiments illustrated in FIGS. 3, 3A, and 4 are preferably used with an outer housing 59 illustrated in FIG. 5. The housing of FIGS. 3, 3A and 4 are inserted into outer housing 59 and held in place with set screws 61. The outer housing is placed in a drain and may be permanently installed as part of the drain opening. A gasket 100 which can provide a liquid-tight seal, may be placed around inner housing 60 and upon placing inner housing 60 into outer housing 59, a liquid-tight seal is formed. When excessive hydrocarbon contaminated water is present, the absorption media will form a plug sealing off the spill from discharging into the drain. Once the spill has been remedied, the apparatus may be dismantled to remove the conglomerated absorption media to provide a fresh surface area ready for removing hydrocarbons. If the treatment compartment is a cartridge, the cartridge may be replaced with a fresh cartridge and the apparatus replaced in the drain for service. A means for preventing back wash of any liquid through the apparatus while permitting uninterrupted downward flow of water through aperture 76 is shown by floater ball 98. Floater ball 98 is kept within outer housing 59 by an inner lip. Furthermore, a pre-filter to prevent sediment from building up within the treatment apparatus maybe attached to housing cover 74. Pre-filter 102 comprises a dome of mesh-like material 103 which allows the free flow of water into the treatment apparatus. A center aperture in material 103 allows filter floss 104 to be stuffed into the pocket created between the material 103 and housing surface 74 preventing sediment from entering the treatment apparatus. Pre-filter 102 may be formed by making a pocket of the mesh-like material with two pieces of material such that pre-filters may be sold separately and are available for attachment to existing apparatus. The pre-filter may be attached to housing surface 74 with known adhesive means or by mechanical means which allows easy removal when needed.

The present invention achieves the objects recited above. The apparatus and method of the present invention provides an effective method of treating hydrocarbon contaminated water as a passive system which is also capable of sealing off the flow of contaminated water in the event of a hydrocarbon spill. The filtration compartment of the present invention effectively removes debris and sediment which may clog the treatment compartment which requires less maintenance during service. The compartments of the apparatus of the present invention may also be manufactured in cartridges providing further ease in maintenance. A containment area incorporating the present invention provides both passive means of filtration and removal of hydrocarbons and, in case of fire, would provide a bypass system to control the volume of liquid within the containment area when a deluge system is activated.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of filtering hydrocarbon contaminated water in an area having a drain opening, said method comprising the steps of:

inserting a filtration device into said drain opening;
said filtration device including:
a housing;
a filtration compartment within said housing comprising at least one porous tube extending from a top inner surface of said housing into said filtration compartment;
a treatment compartment located below said filtration compartment within said housing containing a hydrocarbon absorption media capable of absorbing hydrocarbons, said media comprising a material selected from the group consisting of styrene, pentadiene, cyclopentadiene, butylene, ethylene, isoprene, butadiene, propylene and mixtures thereof, and a filtration enabler; and
a bypass system within said housing and traversing said filtration compartment and said treatment compartment flowing said hydrocarbon contaminated water into said filtration device;

filtering debris from said hydrocarbon contaminated water as said hydrocarbon contaminated water passes through said filtering compartment of said filtration device;

removing hydrocarbons in the hydrocarbon contaminated water as said hydrocarbon contaminated water passes through said treatment compartment of said filtration device such that hydrocarbon contaminated water flowing from said treatment compartment is rendered substantially hydrocarbon-free; and controlling an overflow of said hydrocarbon contaminated water within a containment area, by permitting any overflow to bypass said filtration compartment and said treatment compartment by entering said bypass system.

2. The method of claim 1 wherein said bypass system comprises a pipe traversing said filtration compartment and said treatment compartment, said pipe having attached thereto a valve for opening and closing said containment area.

3. The method of claim 1 wherein said hydrocarbon contaminated water became contaminated as a result of a hydrocarbon spill or leak within a walled containment system and wherein said drain opening is an opening in a wall of said containment system, said method further including the step of:

evacuating an amount of said hydrocarbon contaminated water by flowing it through said filtration device.

4. The method of claim 3 wherein said containment system includes a drainage system comprising:

a drainage pipe having a valve at one end, said pipe extending through said filtration device;

a holding tank located at the other end of said drainage pipe, and a pump for evacuating said hydrocarbon contaminated water from said containment area.

5. The method of claim 4 wherein said drainage system further includes an expandable, temporary holding tank connected to said holding tank such that said hydrocarbon contaminated water may be pumped from said holding tank to said expandable, temporary holding tank.

6. The method of claim 4 wherein said valve is constructed and arranged to be remotely operated.

7. The method of claim 4 wherein said holding tank is located below ground.

8. The method of claim 1 wherein said step of inserting includes installing a gasket disposed around said housing such that said gasket provides a liquid-tight seal between said housing and said drain opening.

9. The method of claim 1 wherein said hydrocarbon contaminated water became contaminated as a result of a hydrocarbon spill or leak.

10. The method of claim 9 wherein said hydrocarbon spilled or leaked from an electrical transformer or an oil tank.

* * * * *